(12) United States Patent
Blajda

(10) Patent No.: US 11,971,155 B2
(45) Date of Patent: Apr. 30, 2024

(54) MOUNTING BRACKET FOR AFFIXING LIGHT FIXTURES TO PILINGS

(71) Applicant: Donald Blajda, Belmont, NH (US)

(72) Inventor: Donald Blajda, Belmont, NH (US)

( * ) Notice: Subject to any disclaimer, the term of this patent is extended or adjusted under 35 U.S.C. 154(b) by 206 days.

(21) Appl. No.: 17/186,083

(22) Filed: Feb. 26, 2021

(65) Prior Publication Data

US 2022/0275928 A1 Sep. 1, 2022

(51) Int. Cl.
*F16M 13/02* (2006.01)
*F21V 21/08* (2006.01)

(52) U.S. Cl.
CPC ............. *F21V 21/08* (2013.01); *F16M 13/02* (2013.01)

(58) Field of Classification Search
CPC ........ F16M 13/02; F21V 21/116; F21S 8/083; F21S 8/088
USPC ................................ 362/370, 431; 248/219.2
See application file for complete search history.

(56) References Cited

U.S. PATENT DOCUMENTS

| | | | | |
|---|---|---|---|---|
| 3,508,731 A * | 4/1970 | Jablonski | ............... | F21V 21/116 248/219.2 |
| 4,074,941 A * | 2/1978 | Jablonski | ............... | F21V 21/116 248/219.2 |
| 5,664,748 A * | 9/1997 | Speece | ............... | A47G 29/1216 248/219.2 |
| 6,116,556 A * | 9/2000 | Roth | ............... | E04H 12/24 248/219.2 |
| 6,722,637 B2 * | 4/2004 | Burkart | ............... | E04H 17/20 256/19 |
| 7,618,166 B1 * | 11/2009 | Truax | ............... | F21S 8/02 362/365 |
| 8,322,598 B1 * | 12/2012 | Farentinos | ............ | A47G 29/1216 248/219.2 |
| 8,444,300 B2 * | 5/2013 | Chang | ............... | F21V 29/713 362/264 |
| 8,646,735 B2 * | 2/2014 | Bradley | ............... | E04H 17/20 256/65.02 |
| 9,004,423 B2 * | 4/2015 | Aldrich | ............... | E04H 17/00 248/219.2 |
| 9,874,338 B2 * | 1/2018 | Verfuerth | ............... | F21S 8/08 |
| 11,466,414 B2 * | 10/2022 | Hughes, Jr. | ............... | E01F 9/608 |
| 2014/0077046 A1 * | 3/2014 | Borowiak | ............ | A47G 29/1216 248/219.2 |
| 2015/0136923 A1 * | 5/2015 | Berio | ............... | A01G 9/02 248/219.2 |
| 2022/0275917 A1 * | 9/2022 | Huang | ............... | F21V 19/04 |

FOREIGN PATENT DOCUMENTS

JP 3929521 B2 * 6/2007
JP 3929521 B2 6/2007

* cited by examiner

*Primary Examiner* — Bradley Duckworth
(74) *Attorney, Agent, or Firm* — Wolf, Greenfield & Sacks, P.C.

(57) ABSTRACT

The present invention is a mounting bracket that may be secured on top of a hollow piling, pipe, or pole and then used to mount a lighting fixture or other fixture thereto. It includes inner and outer walls extending downward from a flat base, where the walls of the piling, pipe, or pole may be disposed in the space between the inner and outer walls.

10 Claims, 9 Drawing Sheets

MOUNTING BRACKET FOR AFFIXING LIGHT FIXTURES TO PILINGS

FIELD OF THE INVENTION

The present invention relates generally to mounting brackets, and specifically to a mounting bracket adaptable for use with dock posts and lamp fixtures.

BACKGROUND

Many outdoor areas require lighting for use at night. In particular, docks require lighting as not seeing well on a dock could result in falling in the water surrounding a dock. Retrofitting lighting onto docks can be difficult. Often the pilings, posts, and poles used in dock construction do lend themselves to easy light installment. Further, typical dock posts and poles are of different sizes, necessitating the need for different brackets for use with different installations. Therefore, there is a need for a device that allows for easy light installation to a variety of shapes and sizes of pilings or posts.

SUMMARY OF THE INVENTION

The present invention is a mounting bracket and a mounting bracket kit for mounting a lamp or other item to a post or piling made up of a wall surrounding a space, like a pipe. It is understood that the piling with which the mounting bracket of the present invention is contemplated to be used may be of any length, made of any solid material, and may be of any regular shape, such as a square or a circle. The mounting bracket is particularly envisioned for mounting lamps to pilings, especially pilings on docks. One of at least ordinary skill in the art will recognize, however, that the mounting bracket may be used advantageously to mount many items to a piling and that that the piling need not be associated with a dock.

In its most basic form, the mounting bracket of the present invention includes a flat base with a perimeter; an outer wall extending perpendicularly down from the base; and an inner wall extending perpendicularly down from the base, where the inner wall is within the outer wall so that a space is formed therebetween and that this space is shaped and dimensioned to accept and mount to pilings of at least two different sizes. In a preferred embodiment, the base is square and one side of the base is approximately 88.9 mm long, although it is understood that any specific measurements included herein are merely exemplary and that other sizes are possible and considered to be within the scope of the present invention. The mounting bracket can be positioned on top of a piling so that the walls of the piling are positioned in this space between the inner and outer walls. With the inner and outer walls on either side of the walls of the piling, the mounting bracket is held firmly in place on top of the piling and can be used from there to secure a lamp or other item to the piling.

Importantly, these structures allow for the installment of the mounting bracket on several different sized pilings, pipes, posts, or poles. With a larger post, it is possible that only the outer walls would engage with the post and space would remain between the post and the inner walls, which would be unengaged. In this discussion, "larger" or "smaller" refers to the dimension of the post that is the diameter of a round post or the length of a side of a cross section of a square post, for example. Similarly, a smaller post may engage only with the inner walls, leaving space between the post and the outer walls, which remain unengaged.

In preferred embodiments, the mounting bracket of the present invention also includes a perimeter wall, which extends perpendicularly down from the base and follows the perimeter of the base. It is also preferred that the mounting bracket of the present invention include at least one outer wall support extending between the outer wall and the perimeter wall. Each of the outer wall and perimeter wall has a height and it is preferred that the outer wall height be greater than the perimeter wall height. In a preferred embodiment, the outer wall height is approximately 38.1 mm and the perimeter wall height is approximately 19.05 mm, or half the height of the outer wall height. The preferred outer wall supports extend between the outer wall and the bottom of the perimeter wall. The outer wall supports are preferably curved inward, away from the perimeter wall and toward the outer wall. The outer wall supports act as structural reinforcement against any outward pressure that may be applied to the outer wall when the mounting bracket is in place on top of a piling. In embodiments that do not include a perimeter wall, the post support of the present invention may still include at least one outer wall support extending between the outer wall and the base surrounding the outer wall.

In some embodiments, the outer wall has at least one outer wall aperture so that the outer wall is not an unbroken wall within the perimeter of the base. The outer wall preferably has up to four apertures, dividing the outer wall into four outer wall segments. It is preferred that each outer wall segment include an outer wall support.

It is preferred that the inner and outer walls be octagonal or round. It is understood that the inner and outer walls may be other regular shapes, such as square, however.

In some embodiments, the base includes a center hole in the center of the base. The center hole is surrounded by the inner wall and has a center hole diameter. In a preferred embodiment, the center hole diameter is approximately 22.73 mm.

In some embodiments, the inner wall includes inner wall protrusions that protrude inward toward the center of the base. A slender post, such as a post that a lamp might include may be inserted into the center hole of the base and the inner wall protrusions may hold that post in place.

Preferred embodiments of the mounting bracket of the present invention include means for securing an item, preferably a lamp or light fixture, to the base of the mounting bracket. These means may be, for example, screw holes through the base that coordinate with. One of at least ordinary skill in the art will recognize there are many ways that such a mounting bracket may be used to secure a lamp and each of these are contemplated as being within the scope of the present invention. Some embodiments of the present invention also include a pedestal top. The pedestal top fits over the base of the mounting bracket, effectively increasing the foot print and flat usable space of top of the base. The pedestal top may be screwed onto the base through screw holes, for example. Alternatively, the pedestal top may include a seat, which is a contouring of the pedestal top so that it sits easily on top of the base. In some embodiments, however, a pedestal top is not necessary because the base of the mounting bracket is already large enough to provide a sufficient space on top of the mounting bracket.

In its most basic form, the kit of the present invention includes a lamp and a mounting bracket of the present invention in any of the embodiments described above. The lamp may be any suitable lighting fixture. As discussed above, the lamp may also not be a lighting device at all, but some other item to be affixed to the piling. The means for securing the lamp to the mounting bracket may be screw holes through both the base and the lamp and screws that can then be threaded through both sets of screw holes and thereby secure the base and the lamp together. The means for securing may also be inherent in the nature of the lamp. If the lamp includes a slender post, for example, the means for securing may simply the insertion of that slender post through the center hole of the base within the inner wall of the mounting bracket.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Figure 1:
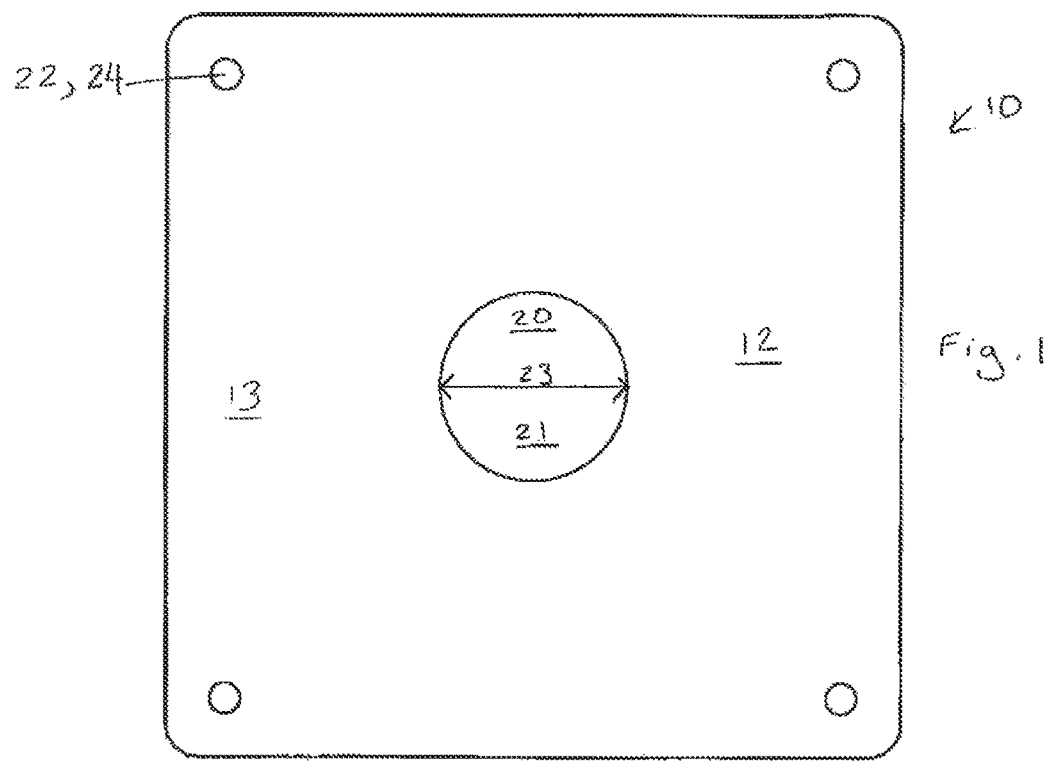
FIG. 1 is a top down view of the mounting bracket of the present invention.

Referring first to FIG. 1, a top down view of mounting bracket 10 of the present invention is provided. Base 12 has flat top 13 and hole 20 in center 21 with center hole diameter 23. Center hole diameter is preferably 22.73 mm. Mounting bracket 10 includes means 22 for securing mounting bracket 10 to an item. In this view, means 22 are screw holes 24 and screws 26 (shown in FIG. 7b) to go through them.

Figure 2:
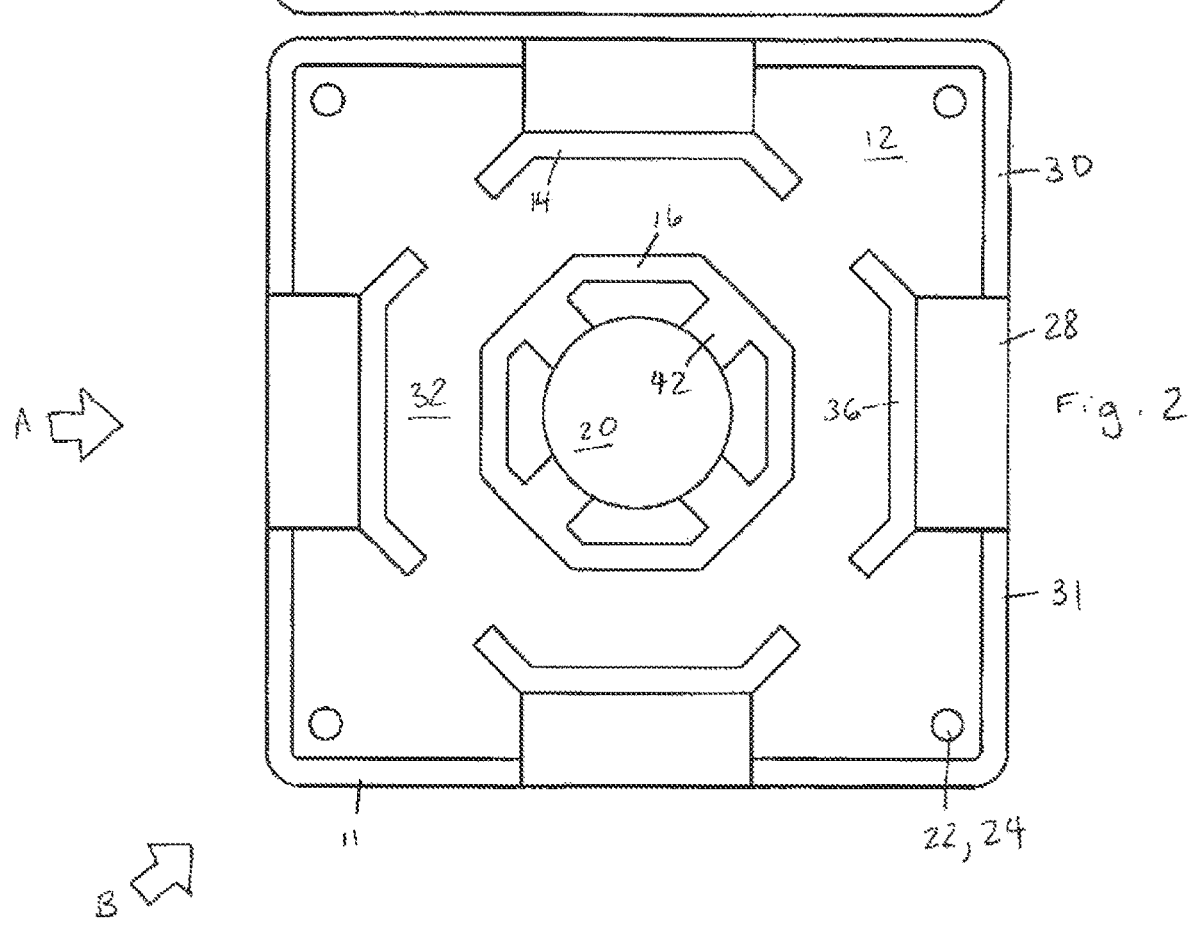
FIG. 2 is a bottom up view of the mounting bracket of the present invention.

Now referring to FIG. 2, a bottom up view of mounting bracket 10 of the present invention is provided. Mounting bracket 10 includes flat base 12 with perimeter 11; outer wall 14 extending perpendicularly down from flat base 12; inner wall 16, also extending perpendicularly down from flat base 12, within outer wall 14; and space 32 formed between outer and inner walls 14, 16. Both inner wall 16 and outer wall 14 are shown as octagonal in shape, but it is understood that they may be round or circular in shape, or shaped in any other regular shape. Outer wall 14 has four, regularly-spaced outer wall apertures 18, which break outer wall 14 up into four regularly-spaced outer wall segments 36. Base 12 has center hole 20 disposed at center 21 of base 12. Center hole 20 is within inner wall 16. Inner wall 16 includes inner wall protrusions 42 that protrude inwardly from inner wall 16 toward center 21. Mounting bracket 10 also includes perimeter wall 30, which follows perimeter 11 of base 12; also extends perpendicularly down from base 12; and has perimeter wall bottom 31. Outer wall supports 28 extend between outer wall segments 36 and perimeter wall 30. Again, means 22 for attaching base 12 to an item are screw holes 24 and coordinating screws. Arrows A and B indicate the side view perspectives of FIGS. 4a and 4b, as discussed below.

Figure 3:
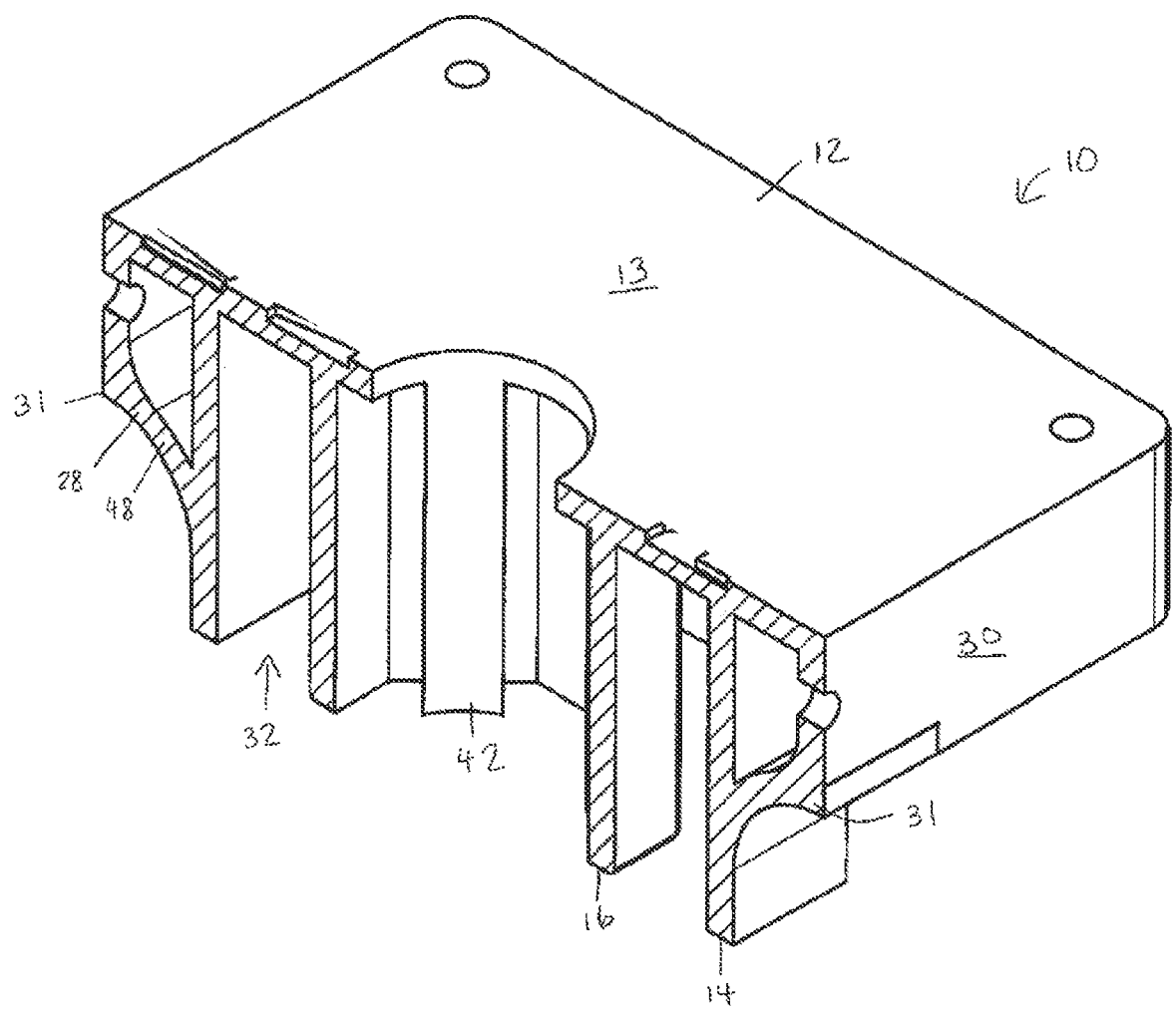
FIG. 3 is a perspective cutaway view of the mounting bracket of the present invention.
Figure 7A:
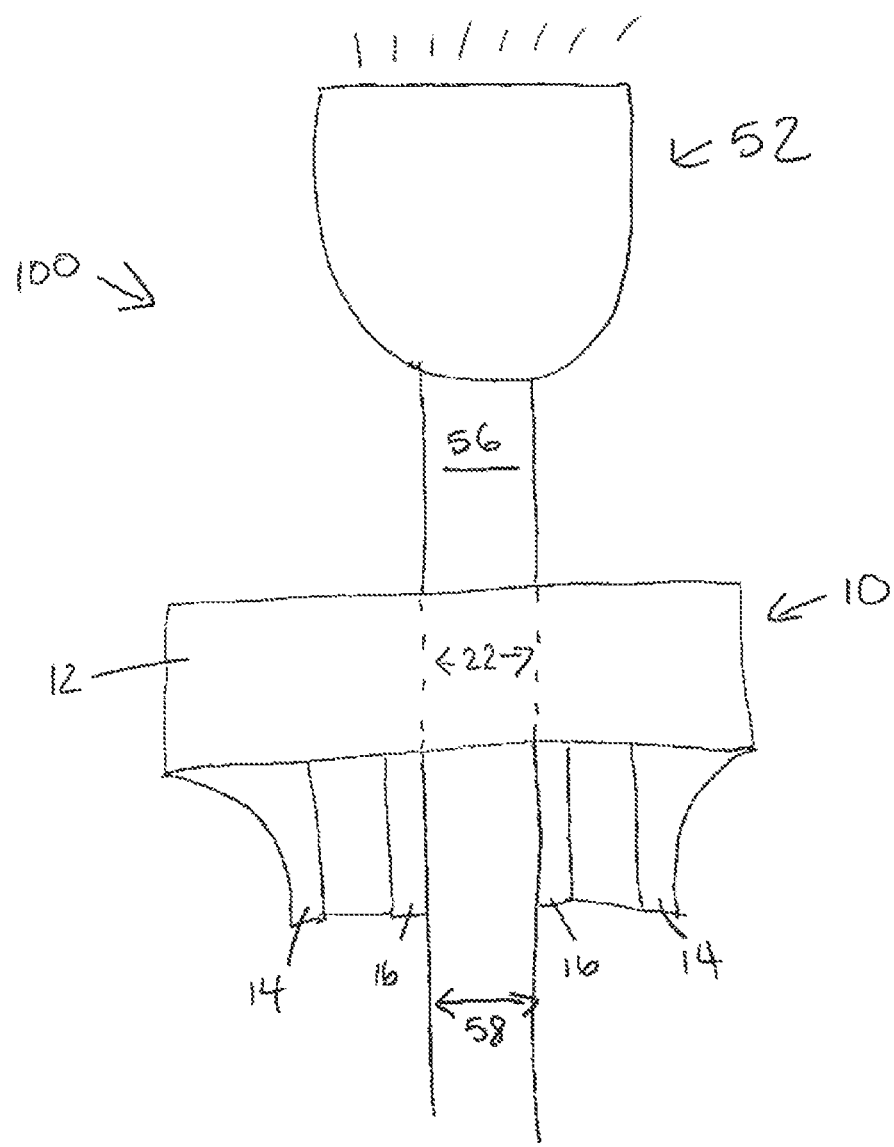
FIGS. 7a and 7b are side views of the mounting bracket kit of the present invention with two different lamps and two different means for securing the mounting bracket and base together.

Now referring to FIG. 3, a perspective cutaway view of mounting bracket 10 of the present invention is provided. Base 12 has top 13 that faces away from inner and outer walls 16, 14. The perpendicular extension down from base 12 of inner wall 16, outer wall 14, and perimeter wall 30 is clear in this view. Inner wall protrusion 42 extends within inner wall 16 down its entire height. A slender post may be inserted directly within inner wall 16 and inner wall protrusions 42 may hold such a post more securely in place, as is shown in FIG. 7a and discussed with reference thereto. As shown more clearly in FIG. 4a and discussed below, outer wall 14 is taller than perimeter wall 30. Outer wall supports 28 extend between outer wall 14 and bottom 31 of perimeter wall 30 and have slight concavity or curvature 48 toward outer wall 14. It is understood that in embodiments that do not include perimeter wall 30, outer wall supports 28 extend between outer wall 14 and base 12.

Figure 4A:
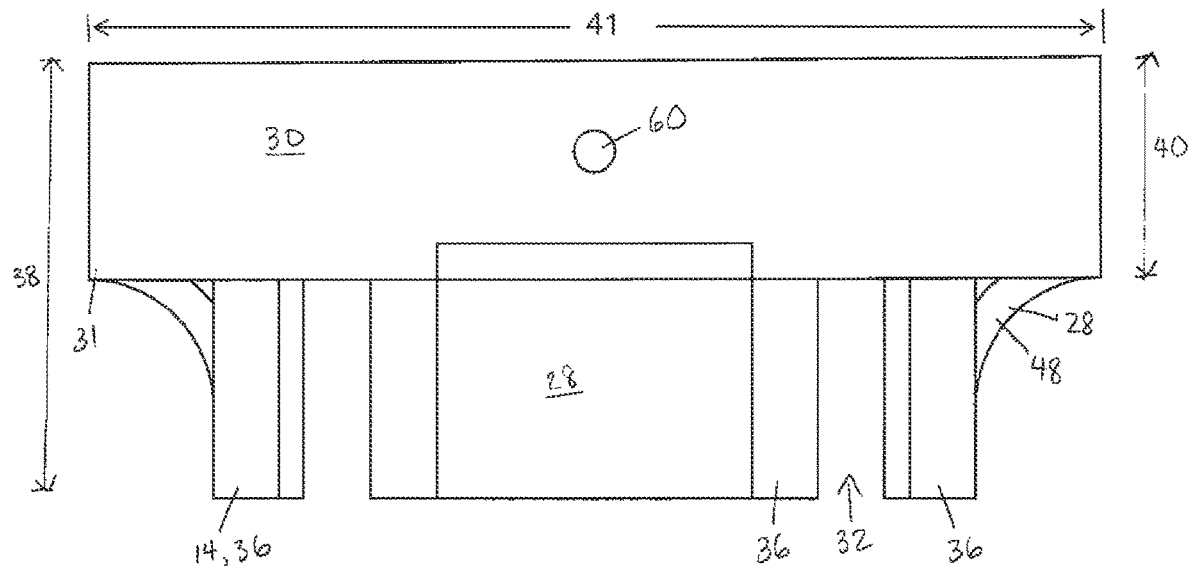
FIG. 4a is a side view of the mounting bracket of the present invention as viewed along arrow A in FIG. 2.
Figure 4B:
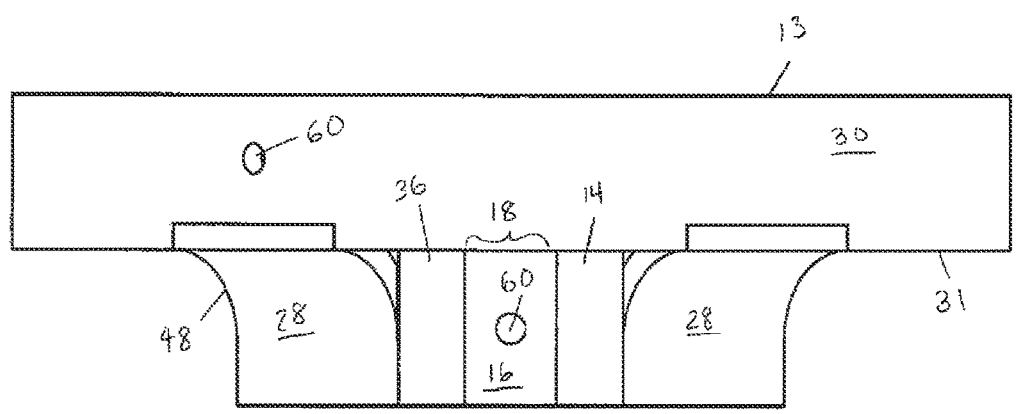
FIG. 4b is a side view of the mounting bracket of the present invention as viewed along arrow B in FIG. 2.
Figure 6:
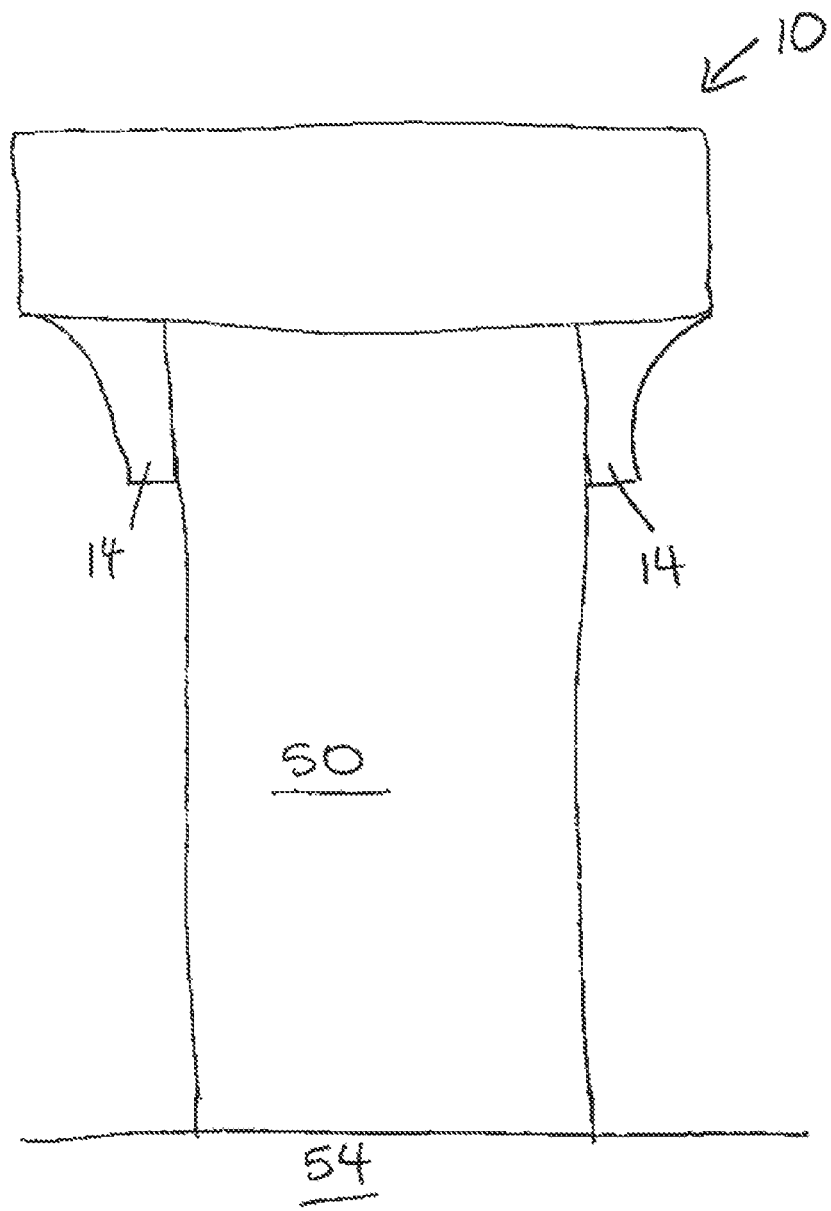
FIG. 6 is a side view of the mounting bracket of the present invention in use with a dock piling.

Now referring to FIGS. 4a and 4b, side views of mounting bracket 10 as viewed along arrows A and B from FIG. 2 are provided, respectively. In FIG. 4a, three outer wall segments 36 of outer wall 14 are shown. While inner wall 16 is hidden from this view, space 32 between inner and outer walls 16, 14 is visible. Perimeter wall 30 has perimeter wall height 40, which is preferably 19.05 mm. Outer wall 14 has outer wall height 38, which is preferably 38.1 mm. Outer wall height 38 is greater than perimeter wall height 40. Outer wall supports 28 extend between outer wall segments 36 and bottom 31 of perimeter wall 30. The curvature 48 of outer wall supports 28 toward outer wall 14 is visible. The outer wall supports 28 and their curvature 48 provide structural support and the possibility of some flexion in outer wall 14 when a piling or post is inserted between outer wall 14 and inner wall 16 and exerts outward forces on outer wall 14. In FIG. 4b, a portion of inner wall 16 is visible through aperture 18 between two outer wall segments 36 of outer wall 14. Again, outer wall supports 28 with curvature 48 are visible extending between outer wall 14 and bottom 31 of perimeter wall 30. Additional screw holes 60 may be included as shown, for examples, through perimeter wall 30 and/or inner wall 16. Screws may be deployed through these additional screw holes 60 to further secure mounting bracket 10 to a piling 50 (as shown in FIG. 6) that may be disposed between inner and outer walls 16, 14 or to a lamp post 56 (as shown in FIG. 7a) that may be disposed through center hole 20. Base 12 preferably has a side length 41 of 88.9 mm.

Figure 5:
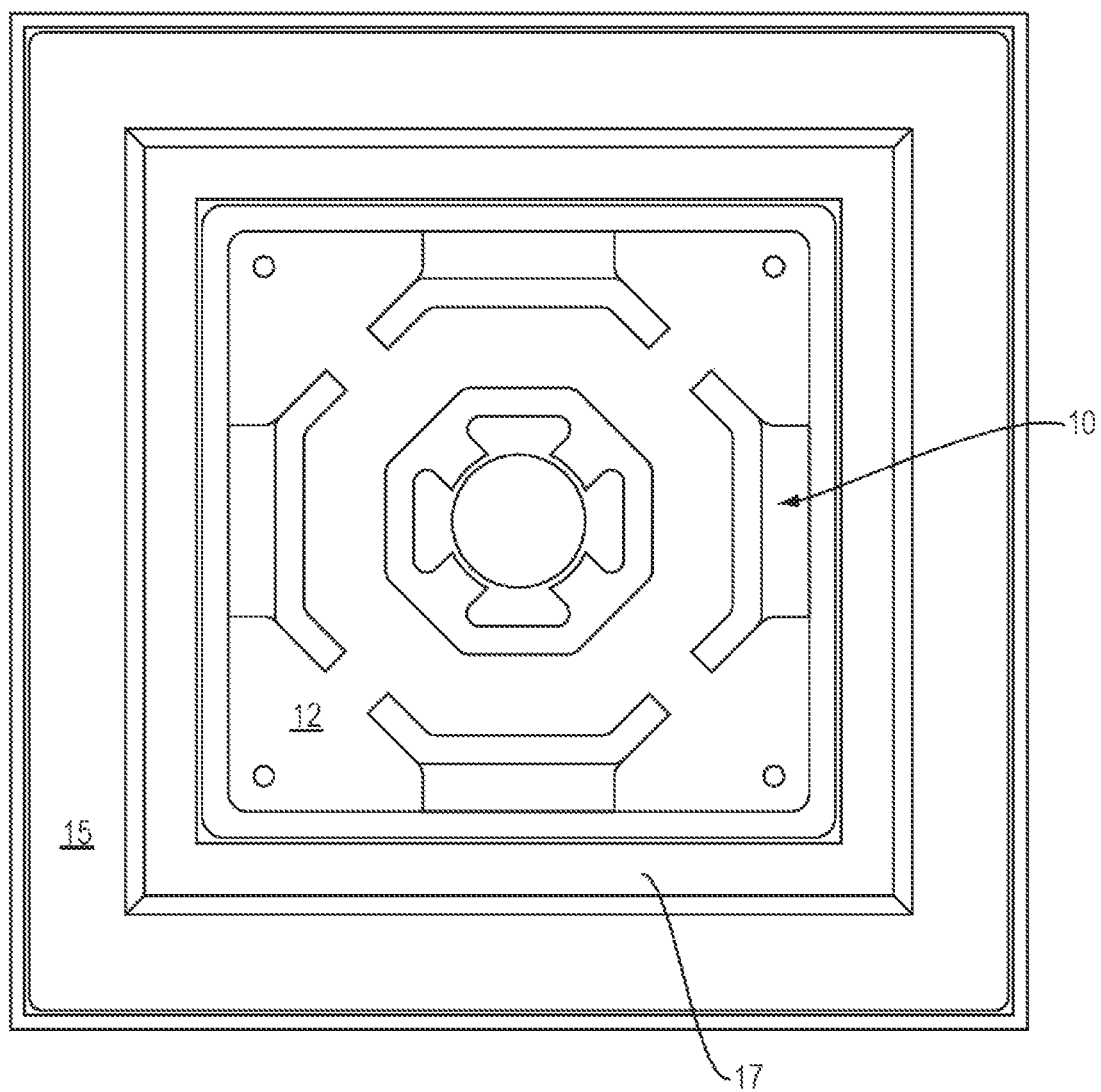
FIG. 5 is a bottom up view of the mounting bracket of the present invention with a pedestal top.

Now referring to FIG. 5, a bottom up view of mounting bracket 10 of the present invention with pedestal top 15 is provided. Pedestal top 15 fits over base 12, effectively increasing the foot print and flat usable space of top 13 of base 12. Pedestal top 15 may be screwed onto base 12 through screw holes 24, for example. As shown, however, pedestal top 15 includes seat 17, which is a contouring of pedestal top 15 so that it sits easily on top of base 12.

Now referring to FIG. 6, a side view of mounting bracket 10 of the present invention in use with a piling 50 is provided. Piling 50 extends up from dock 54. Although not visible from this view, it is understood that piling 50 is hollow, like a metal pipe. Mounting bracket 10 has been placed over piling 50 so that the sides of piling 50 are in space 32 between outer and inner walls 14, 16. As such, only outer walls 14 are visible from this view. A lamp or other item may then be secured or affixed to mounting bracket 10, thus providing an easy light installation on dock 54.

Figure 7B:
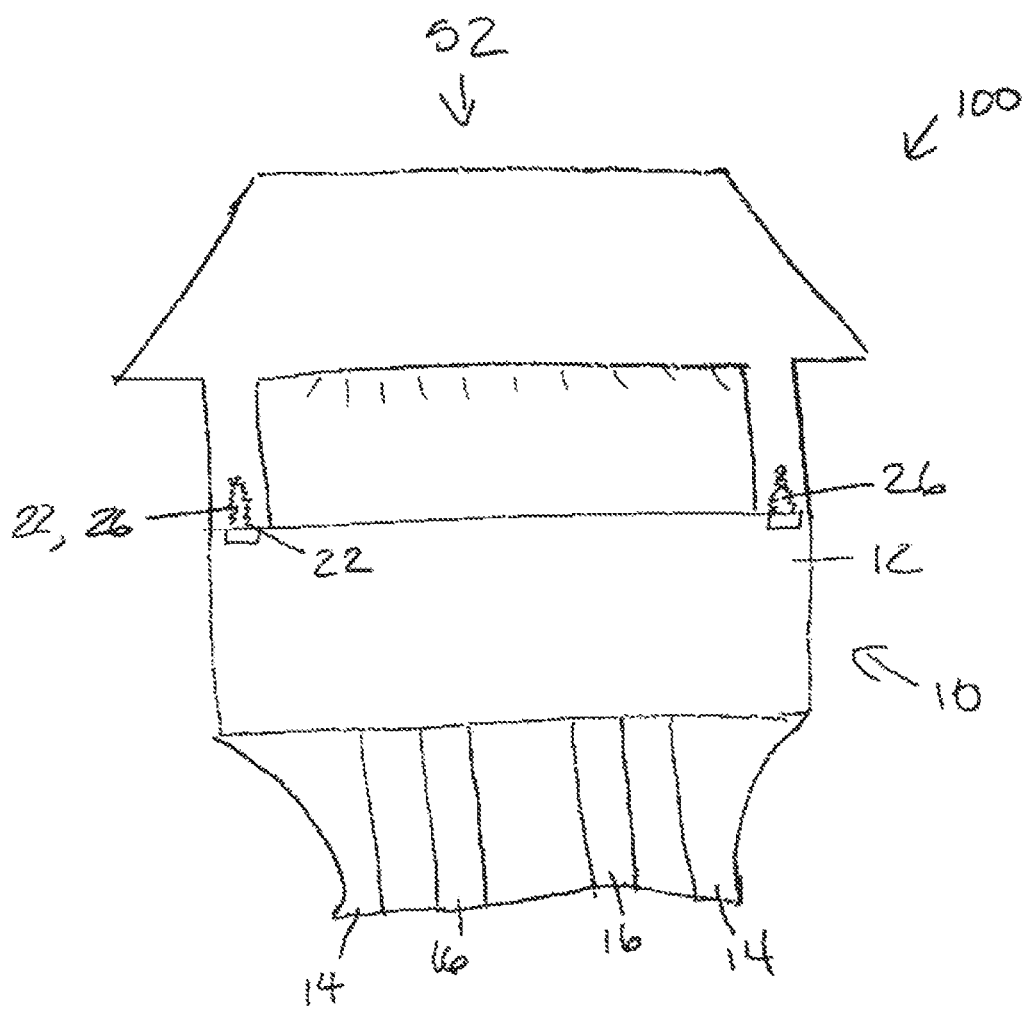

Now referring to FIGS. 7a and 7b, side views of mounting bracket kit 100 of the present invention are provided. Kit 100 includes mounting bracket 10 and lamp 52. Although kit 100 is not shown mounted on top of piling 50, it is understood that it could be mounted as shown in FIG. 6. In FIG. 7a, lamp 52 has lamp post 56 with post diameter 58. In this embodiment of kit 100, means 22 for securing lamp 52 to base 12 of mounting bracket 10 the fact of center hole diameter 23 (shown in FIG. 1) being greater than post diameter 58 so that post 56 can extend through center hole 20 (also shown, e.g., in FIG. 1) within inner walls 16. Inner wall protrusions 42, not shown in this view, may aid in holding lamp post 56 in place. In FIG. 7b, lamp 52 is disposed on top of mounting bracket 10 and means 22 for securing lamp 52 to base 12 of mounting bracket 10 are screws 26 extending through screw holes 24 (shown, e.g., in FIG. 1) into lamp 52 to hold lamp 52 in place. It is understood that outer and inner walls 14, 16 may not be visible as shown in FIGS. 7a and 7b, but they are included therein to illustrate the features of the kit 100 of the present invention.

Figure 8A:
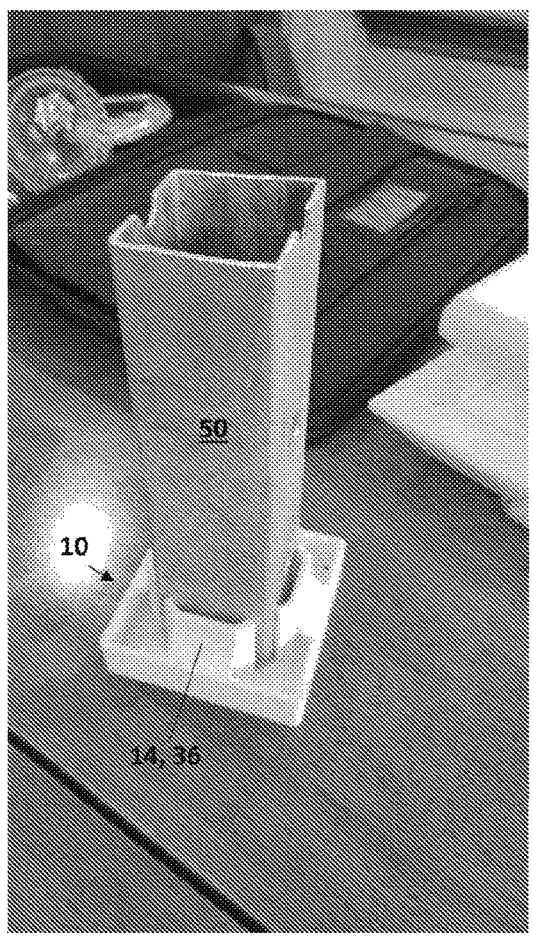
FIGS. 8a-8c are perspective views of the mounting bracket of the present invention engaging with posts of different shapes and sizes.
Figure 8B:
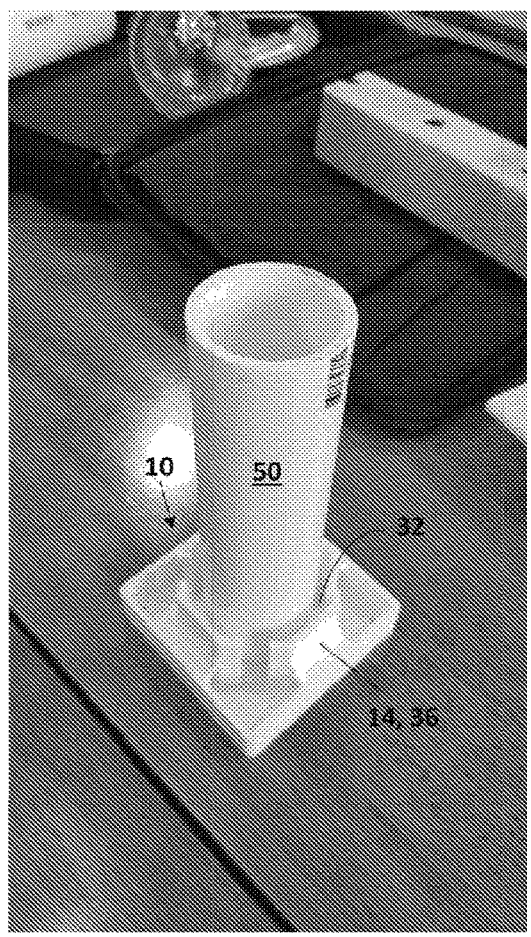
Figure 8C:
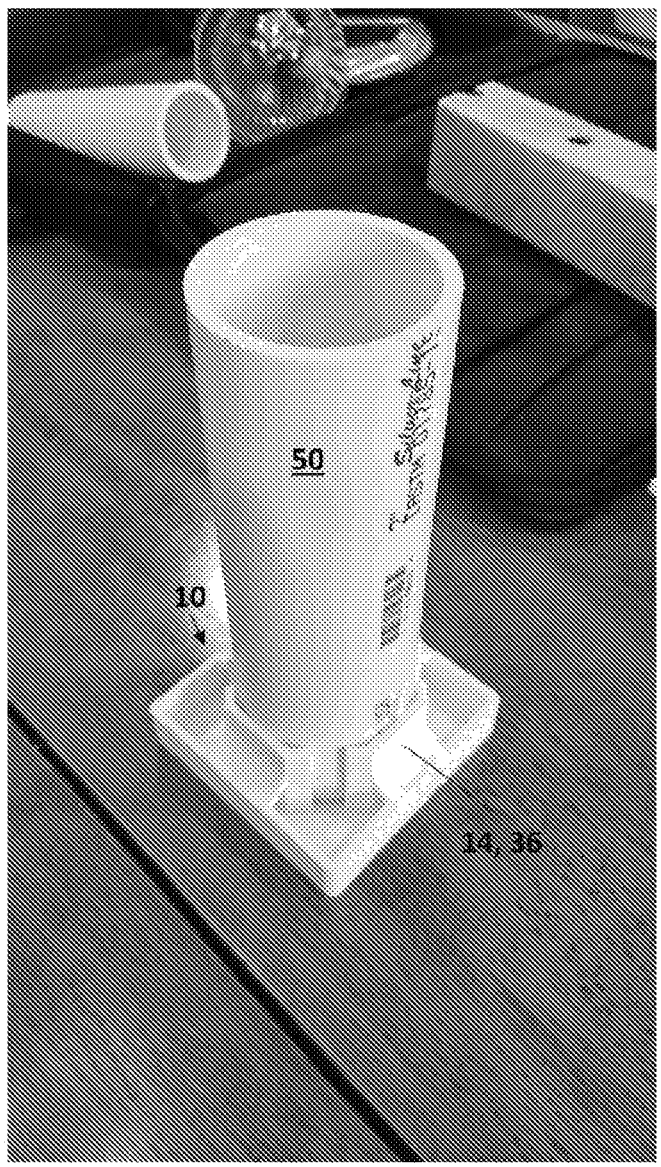

Now referring to FIGS. 8a-8c, perspective views of mounting bracket 10 engaging with posts/pilings 50 of different shapes and sizes are provided. It is understood that each of FIGS. 8a-8c are presented essentially upside down from how a mounting bracket 10 would realistically be applied to a post 50 in the field. This is done for illustrative purposes. In FIG. 8a, mounting bracket 10 is applied to a large, square post 50. This post 50 engages only with outer wall segments 36 of outer wall 14 and is held in place thereby. Although not visible in this view, it is understood that post 50 does not engage will inner wall 16 at all and that some of space 32 remains unoccupied between post 50 and inner wall 16. In FIG. 8b, mounting bracket 10 is applied to a smaller, round post 50. Although not visible, it is understood that this post 50 is engaging only with inner wall 16. Some of space 32 can be seen around post 50 and post 50 is not in contact with outer wall 14 at all. In FIG. 8c, mounting bracket 10 is applied to a larger, round post 50. Again, post 50 is engaging only with outer wall segments 36 of outer wall 14 and it is understood that inner wall 16 does not engage with post 50. Although not shown in any of FIGS. 8a-8c, it is understood that some posts 50 may have sufficiently thick walls that the walls would fill space 32 and engage with both inner walls 16 and outer walls 14 when mounting bracket 10 is applied to the post 50.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A mounting bracket comprising:
   a base configured for mounting an object;
   a receptacle defining a single, integral article, comprising a set of walls extending essentially perpendicularly from the base and defining a plurality of engaging surfaces into which two or more posts, pilings, or poles can independently insert for immobilized engagement, wherein the plurality of engaging surfaces defines at least two of:
   a first set of engaging surfaces configured to immobilize a post, piling, or pole of a first cross-sectional dimension and/or shape;
   a second set of engaging surfaces configured to immobilize a post, piling, or pole of a second, different cross-sectional dimension and/or shape; and
   a third set of engaging surfaces configured to immobilize a post, piling, or pole of a third, different cross-sectional dimension and/or shape.

2. A mounting bracket as in claim 1, wherein the first cross-sectional dimension and/or shape is an essentially circular cross section of a first diameter, the second cross-sectional dimension and/or shape is an essentially circular cross section of a second diameter, and the third cross-sectional dimension and/or shape is non-circular.

3. A mounting bracket as in claim 2, wherein the set of walls defines all of the first, second, and third sets of engaging surfaces.

4. A mounting bracket as in claim 3, wherein the first, second, and third sets of engaging surfaces are configured to receive a first, second, or third post, piling, or pole, each in essentially the same concentric orientation with respect to the bracket.

5. A mounting bracket as in claim 1, wherein the set of walls defines all of the first, second, and third sets of engaging surfaces.

6. A mounting bracket as in claim 5, wherein the first, second, and third sets of engaging surfaces are configured to receive a first, second, or third post, piling, or pole, each in essentially the same concentric orientation with respect to the bracket.

7. A mounting bracket as in claim 1, wherein the sets of engaging surfaces are configured to engage a post, piling, or pole via friction fit.

8. A mounting bracket as in claim 1, wherein the sets of engaging surfaces are configured to engage a hollow post, piling, or pole.

9. A mounting bracket as in claim 1, wherein the mounting bracket is configured to immobilize a post, piling, or pole without an auxiliary fastening item.

10. A mounting bracket as in claim 1, wherein the mounting bracket does not include a screw hole positioned to mate with a screw hole in a post, piling, or pole to which the mounting bracket is immobilized.

\* \* \* \* \*